(12) United States Patent
Kazmi et al.

(10) Patent No.: US 8,792,357 B2
(45) Date of Patent: *Jul. 29, 2014

(54) METHOD FOR GENERATING A CONGESTION FLAG BASED ON MEASURED SYSTEM LOAD

(75) Inventors: Muhammad Kazmi, Bromma (SE); Gabor Fodor, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,457

(22) Filed: Jul. 31, 2012

(65) Prior Publication Data

US 2012/0294149 A1    Nov. 22, 2012

Related U.S. Application Data

(63) Continuation of application No. 12/299,461, filed as application No. PCT/SE2006/050538 on Dec. 5, 2006, now Pat. No. 8,238,249.

(30) Foreign Application Priority Data

May 2, 2006    (SE) ........................................ 0600965

(51) Int. Cl.
*H04L 1/00*    (2006.01)

(52) U.S. Cl.
USPC .......................... 370/237; 370/329; 455/452.2

(58) Field of Classification Search
USPC ......... 370/328, 329, 230, 235, 237, 331, 332, 370/333, 334; 455/423, 436, 437, 438, 439, 455/452.2, 524, 525
See application file for complete search history.

(56) References Cited

U.S. PATENT DOCUMENTS

2009/0201810 A1    8/2009    Kazmi et al.

*Primary Examiner* — Dady Chery (57) ABSTRACT

A radio base station generates a congestion status flag, based on measured resource usage in its cell, and based on performance of sessions in the cell. The flag may be a one bit, or a small number of bits, indicating whether the base station is congested. The flag can be sent to neighboring radio base stations, for use in determining whether to perform handovers to that radio base station. The flag generated in a radio base station, and the flags generated in neighboring radio base stations, can also be sent to user equipment in a cell.

15 Claims, 8 Drawing Sheets

METHOD FOR GENERATING A CONGESTION FLAG BASED ON MEASURED SYSTEM LOAD

CROSS-REFERENCE TO RELATED APPLICATIONS

This application is a continuation of International Application PCT/SE2006/050538, with an international filing date of Dec. 5, 2006, which corresponds to the national-stage entry U.S. patent application Ser. No. 12/299,461, filed Nov. 3, 2008, and which claims priority under 35 U.S.C. §119 to Swedish Application No. SE 0600965-8, filed May 2, 2006, and the contents of all of the preceding are hereby incorporated by reference herein.

FIELD OF THE INVENTION

The present invention relates to methods and arrangements in cellular mobile communication systems, in particular to efficient radio resource management in an evolved UMTS Terrestrial Radio Access (E-UTRA) Network.

BACKGROUND AND SUMMARY

In order to meet high target bit rate requirement in an evolved UMTS Terrestrial Radio Access (E-UTRA) Network, efficient radio resource management (RRM) techniques are required. The realization of efficient RRM methods requires exchange of measurements across different network nodes. The measurement reports indicate the resource usage in a certain network node such as average transmission power level. Generally these measurements are needed before the execution of an RRM function. Since there are different types of resources, there are several kinds of measurement reports that are to be communicated between the network nodes, notably between NodeBs, in order to efficiently perform the RRM operation. Although measurement reports are critically important, excessive or unnecessary measurement reporting should be avoided in order to minimize the signaling overheads. Our key observation is that there are a multitude of radio resource measurements that need to be communicated between radio network nodes for efficient radio resource management.

In cellular systems the RRM techniques, namely admission control and handover control, play a key role in achieving the desired grade and quality of service (GoS/QoS) targets (see also the documents 3GPP TR 25.922 "Radio Resource Management Strategies" and 3GPP TS 25.331 "Radio Resource Protocol Specifications" issued by the 3rd Generation Partnership Project). The main purpose of the admission control is to ensure that the QoS of the new session can be fulfilled. Secondly, it should also ensure that the admission of a new user should not adversely affect the performance of the ongoing sessions.

In UTRA the admission control functionality is located in the radio network controller (RNC), where the radio resource control (RRC) protocol is also terminated. The admission control process in UTRA should take into account several types of resources such as downlink transmitted power, downlink channelization code usage and uplink received total wideband power (RTWP). In UTRA, similarly to admission control, the handover is also carried out by the RNC, which is aware of the resource situation of the target cells, as discussed in the document 3GPP TR 25.922 "Radio Resource Management Strategies".

When a new call or a handover is required, it will be denied if the required resources are not available in the target cell of the target Node B.

Figure 1:
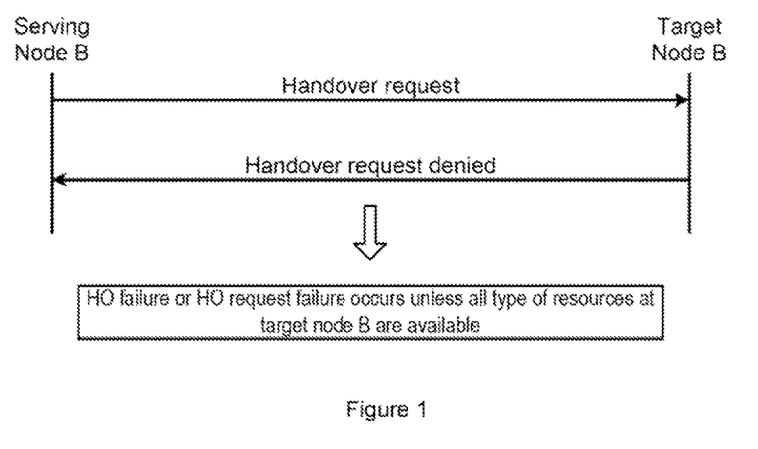
FIG. 1 illustrates a handover attempt failure due to insufficient cell resources.

FIG. 1 illustrates a handover attempt failure due to insufficient cell resources. That is, FIG. 1 illustrates a serving Node B sending a handover request to a target Node B. The handover request is denied by the target Node B since uplink resource blocks are either fully utilized or their usage is above a certain threshold. The handover failure can however be prevented to some extent by inquiring the resource usage at the target Node B prior to handover attempt.

Figure 2:
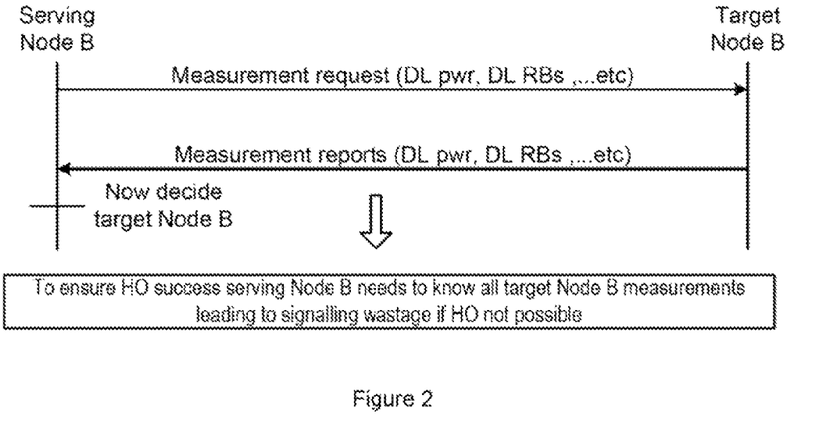
FIG. 2 illustrates measurements required to prevent handover failures, in accordance with the prior art.

FIG. 2 therefore illustrates another scenario, where the serving Node B first requests the target Node B to report its measurements, for all type of resources, in order to prevent any handover failure due to the cell resource bottleneck. Only after receiving the measurement reports does the serving Node B determine whether that possible target Node B should be the target Node B for a handover attempt. It is clear that, in this type of situation where the target Node B cannot serve a new call due to lack of resources, the complete set of measurement reporting is wasteful of bandwidth and leads to unnecessary handover latency. In case of a failure of the handover attempt, the serving Node B typically repeats the above mentioned procedures with the second best target Node B and so on.

Hence, in an existing system the situation may arise in which several handover attempts may be needed before the handover is successfully executed. Secondly this would lead to considerable signaling overheads. The above mentioned problems have been identified and realized already from the past experiences in UTRA. The current WCDMA network utilizes try/fail/adjust/reattempt way of handling resource congestions problems.

It has thus been observed to be a problem that admission control and handover control cannot be efficiently used due to an inefficient use of radio resources. It is thus an objective to reduce unnecessary measurement reports in E-UTRA and a need to specify simple mechanisms of exchanging measurement reports between the Node Bs. There is also a need for devising mechanisms whereby the congestion situation in network could be communicated between the Node Bs in simple manner. For instance, it has been proposed to multicast congestion status in the form of single level of congestion such as available free capacity. In the current proposal the congestion status does not consider the aggregation of all different types of radio, transport network and hardware resources. In addition the congestion status does not include the measured performance such as ongoing grade of service performance. However, a situation can arise in which the system is not fully congested but still the requested QoS requirements cannot be met.

According to an aspect of the present invention, a network node generates a congestion flag, indicative of measured resource usage and measured performance, and this can then be used as a basis for determining whether to attempt to access that node.

In preferred embodiments, the invention can therefore provide some of the following advantages, namely:

A simple way to indicate congestion status to the neighbour base stations and to the UEs.

Minimizing of handover failure and handover attempt failure, thereby improving grade of service. Particular advantage in distributed systems where handover is located in Node B.

Reduction of measurement reports when they are not needed. Particular advantage in distributed systems where excessive reports can overwhelm signalling links between the base stations.

Allowing the serving Node B to update the neighbour cell list. This will allow UE to do measurement on cells, which can accommodate new links. This will also reduce the number of UE measurements.

New call blocking can be reduced. Particular advantage in distributed systems where admission control is located in Node B.

Realization of multi-cell RRM in distributed architecture where there is no centralized controller with radio related information.

DESCRIPTION

Figure 3:
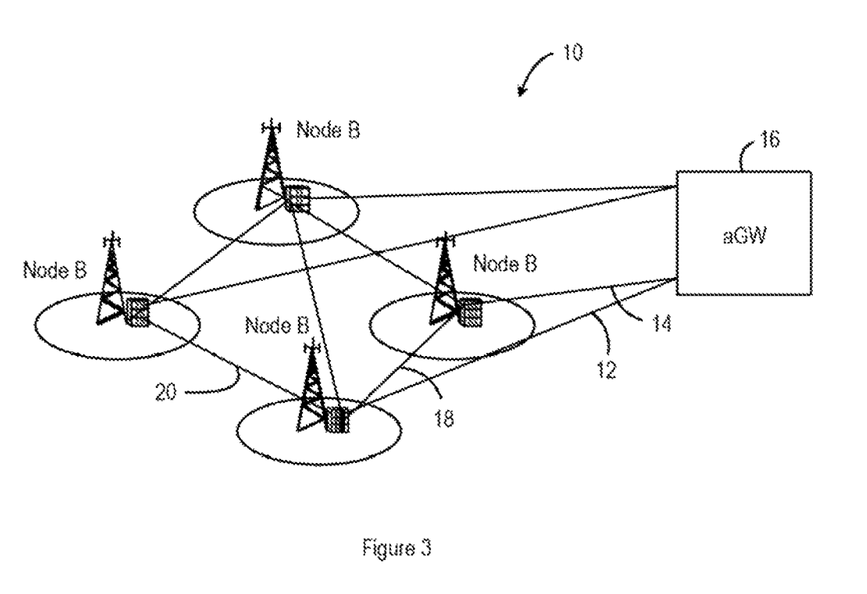
FIG. 3 illustrates a radio access network architecture of E-UTRA.

The present invention is particularly applicable to a cellular wireless communications system, for example as shown in FIG. 3. In the example network shown in FIG. 3, the network 10 is an evolved UMTS Terrestrial Radio Access (E-UTRA) network, although it will be apparent that the invention is similar applicable to other types of network.

FIG. 1 shows a part of the network, containing four radio base stations, or Node Bs, although it will be apparent that the network will contain many more than this number. In E-UTRA, the RRC terminates in the Node B. As shown in FIG. 3, the Node Bs each have respective connections 12, 14, etc, to an access gateway (aGW) 16, which performs only user plane switching but is not aware of any radio related information such as cell load etc. In order to carry out admission control and handovers, the serving network node should be aware of the load at the target node. Thus in E-UTRA both admission control and handovers are placed in the Node B. Each of the direct interfaces 18, 20, etc between the Node Bs (the X2 interfaces) is simply a control plane that can transport measurement reports, handover related commands etc.

E-UTRA is designed to achieve a significantly higher data rate compared to UTRA. Secondly, in E-UTRA the latency requirements of certain functions such as handover, is considerably more stringent than in WCDMA. This means that admission control and handover failures should be minimized because otherwise latency will increase. Thus, in E-UTRA, efficient admission control and handover execution may require the Node B to monitor various types of measurements such as transmitted power, RTWP, resource block usage, transport network channel usage etc. By using more comprehensive resource information at the Node B, the admission and handover decisions can be made more predictable.

In E-UTRA there are several types of radio and network resources that are assigned to a session by the serving Node 13. Some important resources that are to be used in E-UTRA are: the Downlink transmit power; the Uplink received total Interference; the Downlink resource blocks (DL RB); the Uplink resource blocks (UL RB); the Uplink transport network resources (UL TrNetCh); the Downlink transport network resources (DL TrNetCh); and the Hardware resources.

Figure 4:
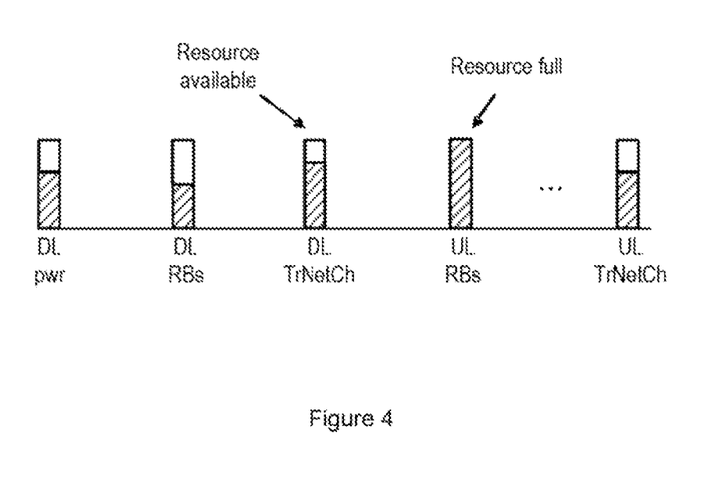
FIG. 4 illustrates an example of the resource situation in a target Node B.

It should be noted that a new call or a handover request can be denied due to the lack of availability of any one of the cell resources listed above. This is illustrated in FIG. 4, which shows certain average usage levels of different types of cell resources in a target cell of the target Node B. FIG. 4 illustrates an example situation, where only one of the cell resources (that is, the uplink resource blocks) is fully occupied, but other resources are still available.

It is the basic idea of the current invention that each Node B generates a congestion status flag based on resource usage and measured performance to indicate whether or not a new connection can be served. The flag can be sent to neighbour Node Bs to prevent handover failures or it can be broadcasted in its own cell to facilitate admission control. The congestion status flag can also be used by the serving Node B to dynamically set the neighbour cell list, which is used by the UE to do downlink measurements.

Figure 5:
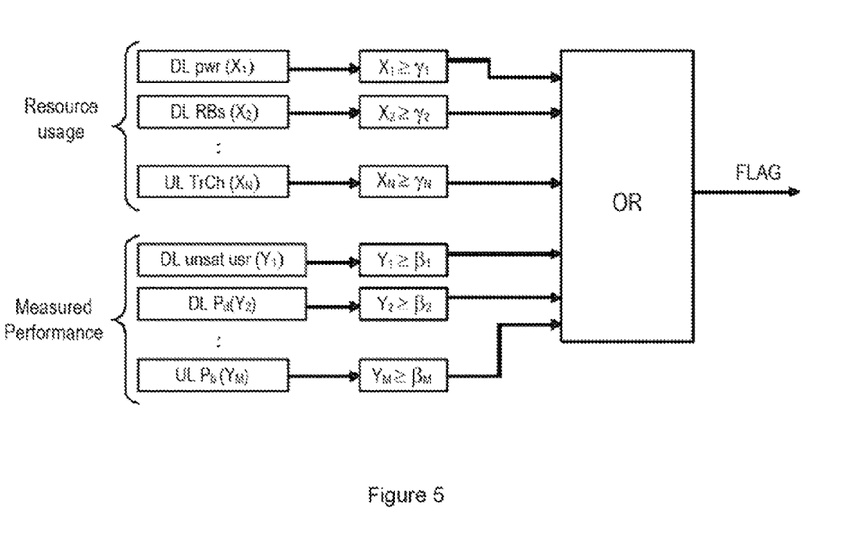
FIG. 5 illustrates an example for a flag generation at a Node B.

FIG. 5 illustrates the generation of the flag in the Node B. Two sets of measurements are fed into the flag generating algorithm as shown in FIG. 5. The first set of measurements relate to usage of resources at the Node B such as the downlink transmitted power ($X_1$), the downlink resource block usage ($X_2$), the uplink transport network channel usage ($X_N$), etc. The second set of measurements relate to the measured performance, which may include the fraction of unsatisfied users ($Y_1$), the new session blocking probability or $P_b(Y_2)$, the ongoing session dropping probability or $P_d$ ($Y_M$), the mean user bit rate etc. The measurements can be done over a certain time period. Different resource and performance metrics types may have different measurement periods.

As shown in FIG. 5, each measurement is compared with a certain threshold. Specifically, as indicated in the figure, $X_i$ and $\gamma_i$ represent measured cell resource i and the corresponding threshold, respectively. Similarly, $Y_i$ and $\beta_i$ represent measured performance i and the corresponding threshold, respectively. In this example, any of the input measurements exceeding its respective threshold would generate a flag=1, indicating congestion in the network. The algorithm that generates the flag in the Node B is implementation dependent (involving the setting of threshold levels, defining the flag generation logic, etc). However, the main idea is the generation of congestion flag based on two sets of measurements: resource usage and measurement performance.

In FIG. 5 the flag generation logic is exemplified by a simple OR operation. Other flag generation mechanisms assigning weights to different resources and hysteresis values are also possible.

In its simplest form, the flag may comprise a single bit of information as depicted in the table below, where Flag=1 and Flag=0 manifest congestion and no congestion situations respectively in a cell.

TABLE 1

| Preventive flag | |
| --- | --- |
| Flag | Meaning |
| 1 | Congestion |
| 0 | NO Congestion |

Different services typically require different amounts of resources. Thus, it is advantageous to have multilevel signalling, i.e. some intermediate levels between congestion and no congestion states. For example, multilevel congestion status can be realized either by using more bits (e.g. 2 bits for 4-levels); or by using multiple states and state transitions with the same number of bits (e.g. 1 bit for 4-levels).

As an example, we can consider the 4-level case, where the congestion status, in addition to the two extreme situations, can also indicate if the target cell can accept low or medium bit rate services. The table below depicts as examples two 4-level congestion status signalling mechanisms, using 2-bits and using a single bit to indicate state transitions, respectively.

| Congestion Flag | | |
| --- | --- | --- |
| Method 1: 2-bits | Method 2: State transition (states) | Meaning |
| 00 | 1 | NO congestion |
| 01 | 2 | Accept medium bit rate |
| 10 | 3 | Accept low bit rate |
| 11 | 4 | Congestion |

Figure 6:
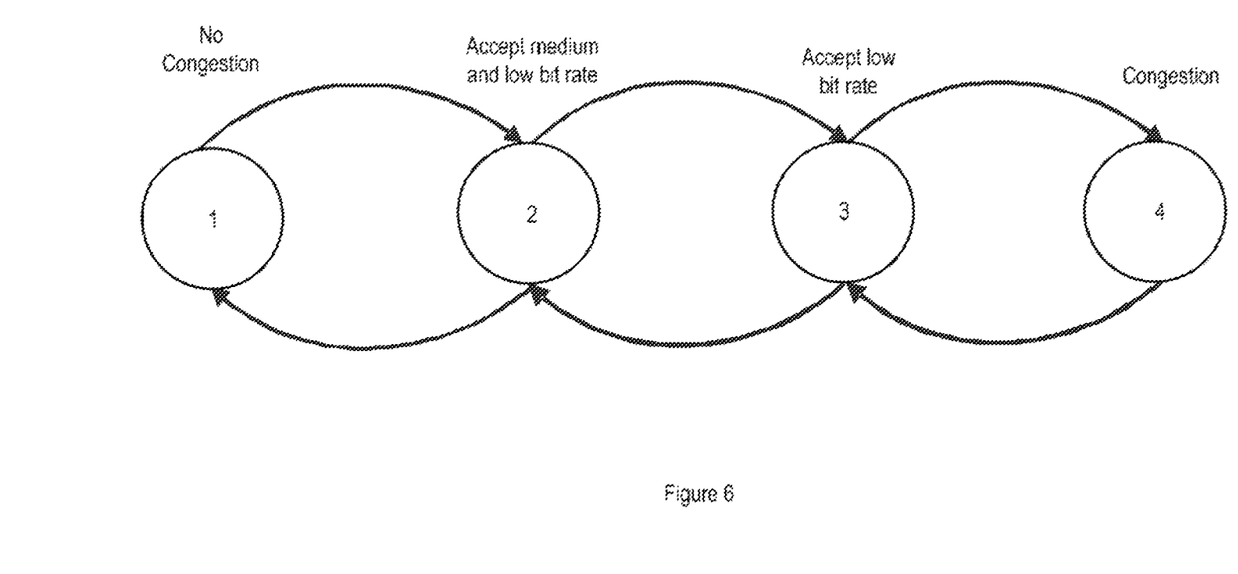
FIG. 6 illustrates a 4-level congestion status diagram realized by single bit using state transition method.

The state transition based signalling mechanism for 4-level congestion status is also illustrated by the 4-state transition diagram in FIG. 6. The state transition method, i.e. method 2 in the table, governs the transitions between congestion states rather than indicating the congestion level itself. Thereby multiple congestion levels are maintained but the signalled information between network nodes is 1 bit at a time. However the obvious drawback is that only adjacent congestion states can be reported using 1 bit. On the other hand, in the first method, whereby each state is explicitly represented by 2-bits, a congestion status report can be completely independent of the previous report. An M-level congestion status flag generation algorithm in the Node B can be realized by having M−1 thresholds for both sets of input parameters: resource usage and measurement performance. Thus, a 4-level congestion status would require 3 thresholds for each type of measurement.

The E-UTRA system shall also support inter-RAT handovers, which means handovers to other access technologies such as UTRA and GERAN. In case Node Bs or base stations belonging to different radio access technologies are co-sited (e.g. UTRA/E-UTRA Node Bs at same location), a multi-RAT flag can also be sent to the neighbour Node Bs of these other RATs. This will provide E-UTRA Node Bs with an overall status of the resource situation in cells belonging to other technologies. The multi-RAT flag can depict 2-level or multilevel congestion status as described above. The table below illustrates an example, where 2-level congestion status indicates the congestion in different technologies. In this example both E-UTRA Node B (eNode B) and GSM base station are congested.

| eNode B ID | Node B ID | GSM BS ID |
| --- | --- | --- |
| 1 | 0 | 1 |

Figure 7:
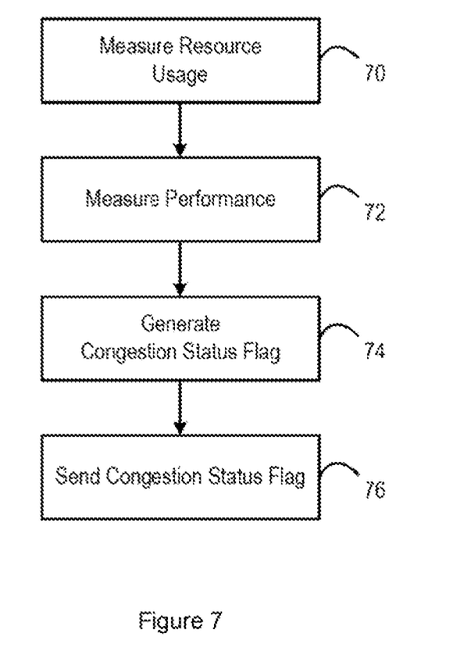
FIG. 7 is a flow chat, illustrating a process for generating a congestion status flag.

FIG. 7 is thus a flow chart, illustrating a method in accordance with the invention, whereby a congestion status flag is generated. In step 70 of the process, measurements are made, relating to the congestion status of the relevant radio base station. As mentioned above, these can include any relevant measurements relating to the downlink or uplink radio or fixed network resources. In step 72, measurements are made, relating to the performance of the base station. As described above, these can include any relevant measurements relating to the performance of the ongoing sessions in a cell. In step 74, a congestion status flag is generated. As described above, the flag can be generated by comparing the relevant measurements with respective thresholds, and then generating the flag to indicate the congestion status of the base station. In step 76, the radio base station transmits the generated congestion status flag to other network entities.

More specifically, regarding step 76, one possibility is that the congestion status flag can be used to prevent handover failures. Thus, each Node B sends the congestion flag to its neighbor Node Bs. The flag will indicate the overall resource situation in the transmitting Node B. This means that, when the transmitting Node B is a potential target Node B for a handover, the serving Node B can be prevented from sending handover requests to that target Node B when it is congested, i.e. when its flag=1. On the one hand this will reduce the handover failure attempt, thereby minimizing handover latency and preventing unnecessary signaling exchange. On the other hand this will allow the serving Node B to select the next possible Node B in terms of resource availability, thereby minimizing the call dropping probability. By using multi-RAT congestion status the handover failures due to congestion of base stations belonging to other access technologies can also be minimized.

The simplest way to send the flag is via the control plane, that is, via the respective Node B-Node B interface 18, 20, etc as shown in FIG. 3, in E-UTRA. It is important to note that the congestion flag can either be sent as a separate message or it can be concatenated to other types of signaling messages. The main advantage of the former scheme is that some overheads such as base station identifier can be reduced. In any case the target base station receiving the congestion status flag should be able to uniquely identify and interpret the meaning of the congestion flag.

Another option is to send the flag by piggybacking it with the user data over the user plane and routing it to the destination Node Bs via the access gateway (aGW) 16. This approach is realizable since the flag comprises only one, or very few, bits. The control plane (Node B-Node B interface) is expected to have much lower capacity than the user plane. Thus, the second approach is also useful in situations where there is congestion on the Node B-Node B control plane.

Figure 8:
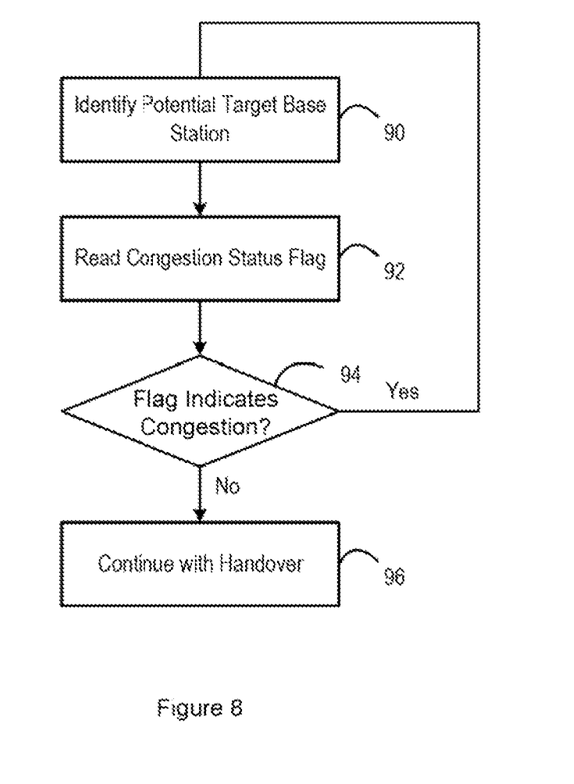
FIG. 8 is a flow chart, illustrating a process for initiating a handover using a congestion status flag.

FIG. 8 is a flow chart, illustrating a process for initiating a handover, using the congestion status flag as described above. Thus, in step 90, the serving base station identifies another Node B as a potential target base station for a handover. In step 92, the serving base station reads the congestion status flag sent by that potential target base station and, in step 94, it determines whether that congestion status flag indicates that the potential target base station is congested. If the flag indicates that the potential target base station is congested, the process returns to step 90, and the serving base station identifies an alternative potential target base station. If the flag indicates that the potential target base station is not congested, the process passes to step 96, and the serving base station proceeds with the handover to that target base station.

The indication of congestion status does not prevent any Node B from requesting measurement reports from neighbouring Node Bs, whose congestion status flags indicate that they are congested. However, a Node B can have an option not to request measurements reports from congested neighbour Node Bs. This will reduce unnecessary signalling overheads and processing at the Node B.

Figure 9:
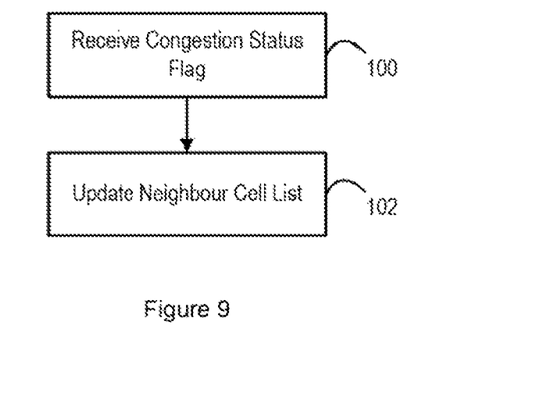
FIG. 9 is a flow chart, illustrating the transmission of the updated neighbour cell list to a user equipment.

The congestion status flag can also be used for dynamic setting of neighbour cell lists. As shown in FIG. 9, in step 100 of that process, a serving Node B can receive the congestion status information reported by one or more of the neighbour Node Bs, as described above. The serving Node B can then update its existing neighbour cell list at step 102 by excluding from that list any neighbouring Node B whose flag=1. The updated list can then be sent to the users in that cell by the serving Node B. This will prevent those users from doing measurements (for handover or cell change) on cells that are congested.

Figure 10:
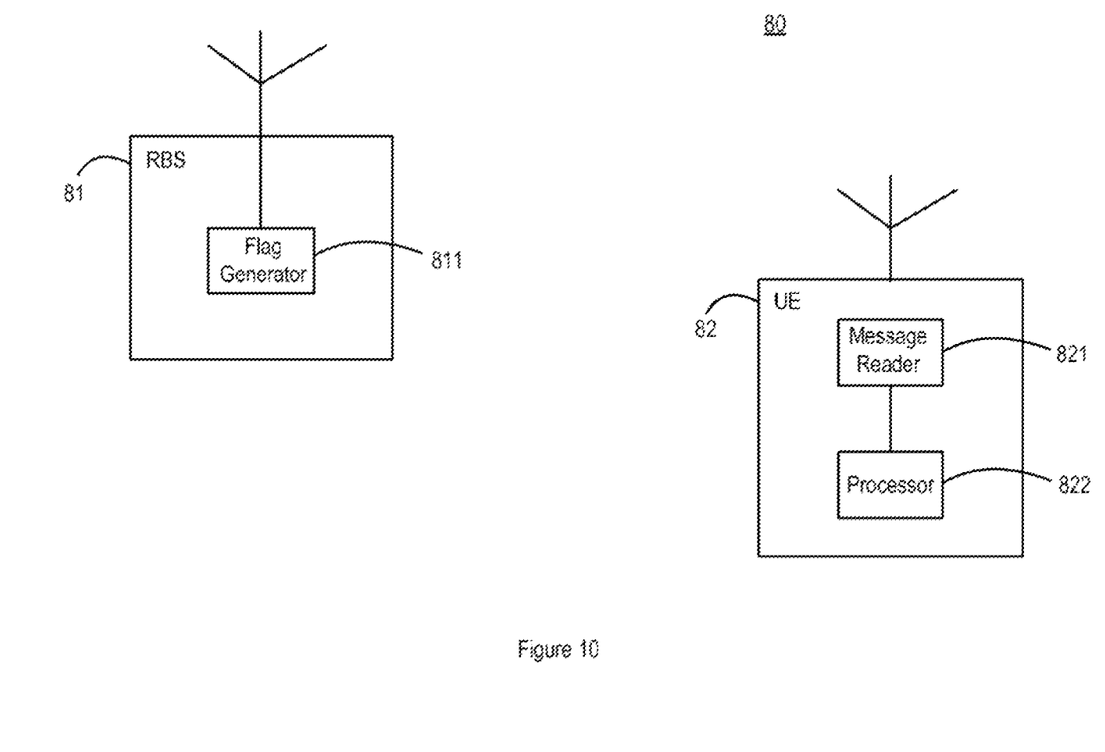
FIG. 10 illustrates a part of a telecommunication network including a radio base station and a user equipment for which the present invention is applied.

Thus, FIG. 10 shows a system including a radio base station (RBS) 81, including a block 811 for generating a congestion status flag, operating as described above. FIG. 10 also shows a user equipment (UE) 82, which may take the form of a mobile phone, or any type of portable wireless communications device, including a block 821 for reading messages received from the RBS 81 and a processor 822.

In the process of FIG. 9, the RBS 81 transmits the updated neighbour cell list to the UE 82, which is able to use that list for future handovers or cell changes.

The congestion status flag can also be used for prevention of admission failures. Thus, considering the system of FIG. 10, the flag can also be broadcast to the users in its own cell using the same signalling mechanism as described above. Moreover, since the serving Node B 81 is also aware of the congestion status in the neighbour Node Bs, the serving Node B 81 can also broadcast the flag status of the neighbour Node Bs. This will prevent the UE 82 from listening to the neighbouring Node Bs for the purpose of inferring the congestion status.

In order to prioritize handover over new calls or vice verse, different measurement thresholds can be used to generate the flag for handovers and for admission control. The UE can then consider the overall resource situation by reading the broadcast flag before initiating a call (e.g. before sending random access request). For example, the UE can avoid access to a congested cell (e.g. whose flag=1) even though it is the best in terms of coverage or quality. Rather, the UE shall access the next best cell in terms of coverage or quality, which is not congested (e.g. flag=0).

The multi-RAT flag can be used to steer the UE to access the best cell belonging to the best possible access technology in terms of available resources.

In the case of UE based handovers (e.g. in fully distributed systems), the broadcast information can also be used by the user equipment to perform handovers.

There is thus described a system for generating congestion status information, which can be used by network entities to operate efficiently.

The invention claimed is:

1. A method of indicating a status of a radio base station of a telecommunication network, the method comprising:
    measuring a usage of a transport network associated with a first radio base station;
    generating a congestion status flag based on the measured usage of the transport network and based on a measured usage of downlink and/or uplink radio resources in the first radio base station, wherein the congestion status flag has one of more than two possible values, and wherein the possible values include a first value indicating a highest level of congestion, a second value indicating a lowest value of congestion, and one or more intermediate values, each intermediate value indicating a respective different intermediate level of congestion; and
    sending the congestion status flag to a second radio base station.

2. The method of claim 1, wherein the congestion status flag is generated by comparing the measured usage of the transport network and the measured usage of downlink and/or uplink radio resources with respective thresholds.

3. The method of claim 1, wherein the flag has two possible values, and wherein one value indicates full congestion whereas the other value indicates no congestion.

4. The method of claim 1, wherein a congestion status having more than two values is signaled by a single bit using state transitions.

5. The method of claim 1, wherein congestion statuses of the first radio base station for multiple access technologies are signaled.

6. The method of claim 1, wherein the congestion status is signaled as a separate and independent message.

7. The method of claim 1, wherein the congestion status is sent by concatenating the congestion status with other signaling messages.

8. The method of claim 1, wherein the congestion status is sent by concatenating or piggybacking it with the user data.

9. The method of claim 1, further comprising sending the congestion status flag to users in a cell associated with the first radio base station.

10. The method of claim 9, further comprising sending a congestion status flag relating to the second radio base station or a third radio base station to users in a cell associate with the first radio base station.

11. A method of operation of a first radio base station of a telecommunication network, the method comprising:
    reading, at a first radio base station, a congestion status flag generated in and received from a second radio base station, the congestion status flag being based on a measured usage of a transport network associated with the second radio base station and based on a measured usage of downlink and/or uplink radio resources in the second radio base station;
    utilizing the congestion status flag to determine a target radio base station for a handover of a call involving a user equipment served by the first radio base station, thereby determining a target radio base station for the handover based at least in part on the usage of the transport network associated with the second radio base station; and
    initiating a handover of the call to the target radio base station.

12. The method of claim 11, wherein the first radio base station, acting as a serving radio base station, utilizes the congestion status flag to dynamically update neighbor cell lists used by user equipment to perform downlink measurements for handovers and cell reselection.

13. A method of operation of a user equipment in a telecommunication network including one or more radio base stations, the method comprising:
    reading a first congestion status flag generated in a first radio base station serving a user equipment, the first congestion status flag being based on a measured usage of a transport network associated with the first radio base station and based on a measured usage of downlink and/or uplink radio resources in the first radio base station;

reading a second congestion status flag generated in a second radio base station in a neighbouring cell, the second congestion flag being based on a measured usage of a transport network associated with the second radio base station and based on a measured usage of downlink and/or uplink radio resources in the second radio base station; and utilizing the first congestion status flag and the second congestion status flag to select a target radio base station with which to establish a new call or perform a handover, thereby selecting the target radio base station based in part on the measured usage of the transport network associated with the first radio base station and the measured usage of the transport network associated with the second radio base station; and initiating one of a handover and a new call with the target radio base station.

14. A radio base station for a telecommunication network, the radio base station comprising:
a processing block configured to:
measure a usage of a transport network associated with the radio base station;
generate a congestion status flag based on the measured usage of the transport network and a measured usage of downlink and/or uplink radio resources in the radio base station, wherein the generated congestion status flag has one of more than two possible values, and wherein the possible values include a first value indicating a highest level of congestion, a second value indicating a lowest value of congestion, and one or more intermediate values, each intermediate value indicating a respective different intermediate level of congestion; and
send the congestion status flag to at least one other radio base station.

15. A user equipment for a telecommunication network including one or more radio base stations, wherein the user equipment comprises:
a processor configured to:
read a first congestion status flag generated in a first radio base station serving the user equipment, the first congestion status message being based on a measured usage of a transport network associated with the first radio base station and a measured usage of downlink and/or uplink radio resources in the first radio base station;
read a second congestion status flag generated in a second radio base station in a neighbouring cell, the second congestion flag being based on a measured usage of a transport network associated with the second radio base station and based on a measured usage of downlink and/or uplink radio resources in the second radio base station; and
utilize the first congestion status flag and the second congestion status flag to select a target radio base station with which to establish a new call or perform a handover, thereby selecting the target radio base station based in part on the measured usage of the transport network associated with the first radio base station and the measured usage of the transport network associated with the second radio base station; and
initiate one of a handover and a new call with the target radio base station.

* * * * *

UNITED STATES PATENT AND TRADEMARK OFFICE
CERTIFICATE OF CORRECTION

PATENT NO. : 8,792,357 B2  
APPLICATION NO. : 13/562457  
DATED : July 29, 2014  
INVENTOR(S) : Kazmi et al.

Page 1 of 1

It is certified that error appears in the above-identified patent and that said Letters Patent is hereby corrected as shown below:

On the Title Page, in item (75), under "Inventors", in Column 1, Line 1, delete "Muhammad Kazmi," and insert -- Muhammad Ali Kazmi, --, therefor.

In the Specification

In Column 4, Lines 5-6, delete "Node 13." and insert -- Node B. --, therefor.

Signed and Sealed this  
Twenty-sixth Day of May, 2015

Michelle K. Lee  
*Director of the United States Patent and Trademark Office*